(12) United States Patent
Abe (10) Patent No.: US 6,387,601 B1
(45) Date of Patent: May 14, 2002

(54) METHOD FOR MANUFACTURING AN INK JET RECORDING HEAD, AND AN INK JET RECORDING HEAD MANUFACTURED BY SUCH METHOD

(75) Inventor: Tsutomu Abe, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/311,897

(22) Filed: May 14, 1999

(30) Foreign Application Priority Data

May 19, 1998 (JP) .......................................... 10-136870

(51) Int. Cl.[7] .............................................. B23K 26/06
(52) U.S. Cl. ...................... 430/320; 430/945; 29/890.1; 219/121.69; 219/121.72; 219/121.73
(58) Field of Search ................................ 430/320, 945; 347/44, 45, 47; 219/121.69, 121.72, 121.73; 29/890.1

(56) References Cited

U.S. PATENT DOCUMENTS

| | | | | |
|---|---|---|---|---|
| 4,994,825 A | * | 2/1991 | Saito et al. ..................... | 347/47 |
| 5,305,018 A | * | 4/1994 | Schantz et al. ................ | 347/47 |
| 5,432,540 A | * | 7/1995 | Hiraishi ........................ | 347/69 |
| 5,657,539 A | * | 8/1997 | Orikasa et al. ............. | 29/890.1 |
| 5,940,957 A | * | 8/1999 | Goto et al. ................. | 29/890.1 |
| 5,948,289 A | * | 9/1999 | Noda et al. ............ | 219/121.69 |
| 6,102,522 A | * | 8/2000 | Hagiwara et al. .............. | 347/55 |

FOREIGN PATENT DOCUMENTS

| | | | |
|---|---|---|---|
| JP | 2-121842 | 5/1990 | |
| JP | 2-121845 | 5/1990 | |
| JP | 2-187346 | 7/1990 | |
| JP | 3-101954 | 4/1991 | |
| JP | 3-101960 | 4/1991 | |
| JP | 4-9291 | 1/1992 | |
| JP | 4-339585 | 11/1992 | |
| JP | 05-318744 | * 12/1993 | |
| JP | 05-338186 | * 12/1993 | .................. 347/47 |
| JP | 8-25639 | 1/1996 | |
| JP | 10-118782 | 5/1998 | |

OTHER PUBLICATIONS

Thompson et al., "Introduction to microlithography", ACS syposium series 219, pp. 20–21, 1983.*

* cited by examiner

Primary Examiner—Martin Angebranndt
(74) Attorney, Agent, or Firm—Fitzpatrick, Cella, Harper & Scinto (57) ABSTRACT

A method for manufacturing an ink jet recording head, which is provided with a ceiling plate having grooves of locally different depth to form ink paths arranged for each of discharge ports; and a substrate having discharge energy generating elements each arranged on a part of each of the paths, and which is structured by bonding the ceiling plate and the substrate together, comprises the steps of performing a first laser processing to process grooves of first depth by irradiating laser beam through a first mask pattern corresponding to the ink path pattern of the ceiling plate; and performing a second laser processing to form a region of locally different depth in each of the grooves by irradiating laser beam through a second mask pattern having the reduced beam pattern to be locally open on the exposure region of the first mask pattern corresponding to the grooves each having the first depth. With the method thus structured, the processing is performed up to the first depth without reducing beam. Then, it is made possible to execute processing steps in good precision without being affected by the carbon produced in the process of the adjacent nozzles.

5 Claims, 12 Drawing Sheets

METHOD FOR MANUFACTURING AN INK JET RECORDING HEAD, AND AN INK JET RECORDING HEAD MANUFACTURED BY SUCH METHOD

BACKGROUND OF THE INVENTION

1. Field of the Invention

The present invention relates to a laser processing method for processing grooves and the like on a work by the irradiation of laser beam. The invention also relates to an ink jet recording head the grooves of which are processed by such processing method.

2. Related Background Art

In recent years, the laser oscillator is widely used as the light source of a processing apparatus. Particularly, the pulse laser oscillator of the ultraviolet region has drawn attention as the light source used for patterning ablation on polymer without development, and the oscillator of this type is utilized (as disclosed in the specifications of Japanese Patent Application Laid-Open No. 02-121845, Japanese Patent Application Laid-Open No. 04-009291, Japanese Patent Application Laid-Open No. 04-339585, Japanese Patent Application Laid-Open No. 02-121842, Japanese Patent Application Laid-Open No. 02-187346, Japanese Patent Application Laid-Open No. 03-101954, Japanese Patent Application Laid-Open No. 03-101960, and others, for example).

Also, as inventions form a laser processed solid configuration by one-processing in the direction of the laser irradiation, the inventions have been disclosed in the specifications of Japanese Patent Application Laid-Open No. 08-25639 and Japanese Patent Application Laid-Open No. 10-118782.

In recent years, however, it has been required for the ink jet recording head, which is processed by the application of the known technologies and techniques, to provide images in higher quality at higher speeds. It is, therefore, contemplated to incorporate many numbers of nozzles in higher density on an elongated head.

Figure 11:
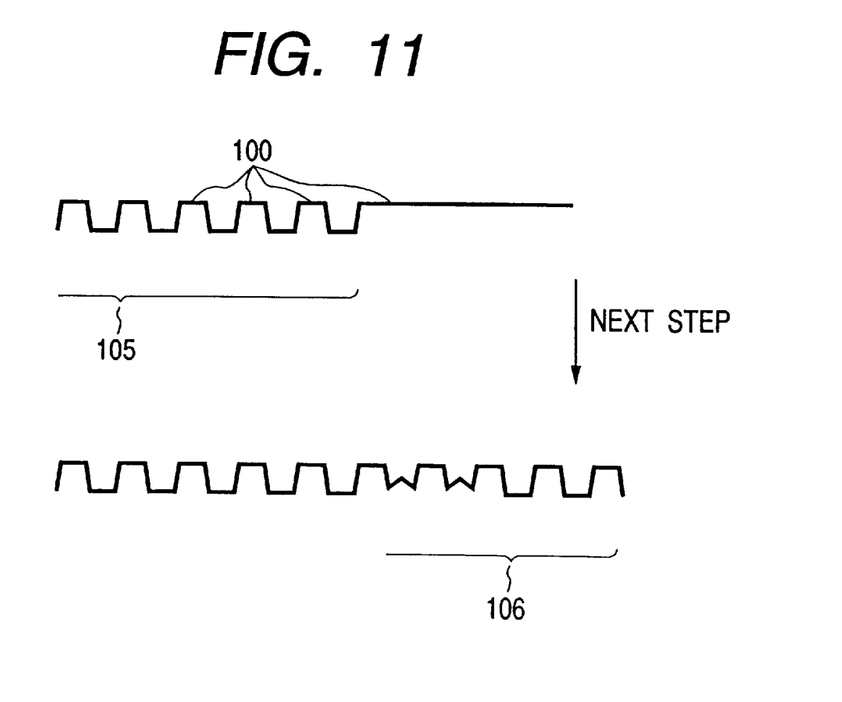
FIG. 11 is a cross-sectional view which shows the groove processing in accordance with the conventional example.

Under such circumstances, if it is attempted to process nozzles for use of an elongated head of as long as four inches having 360 dpi, 1,408 nozzles as disclosed in the specification of Japanese Patent Application Laid-Open No. 08-25639, for example, there is a problem encountered that the region of four inches cannot be processed at a time. Therefore, this region is divided into 11 regions each having 128 nozzles when actually processed. Then, the carbon 100 which has been created from the preceding 128 nozzles thus processed is accumulated in the following region to be processed. This accumulated carbon 100 is greater on the side nearer to the 128 nozzles that have been processed in the last step, and smaller as it is father away from such side (see FIG. 11). Here, in FIG. 11, a reference numeral 105 designates the grooves processed in the preceding step, and 106, the grooves to be processed in the next step.

Figure 12:
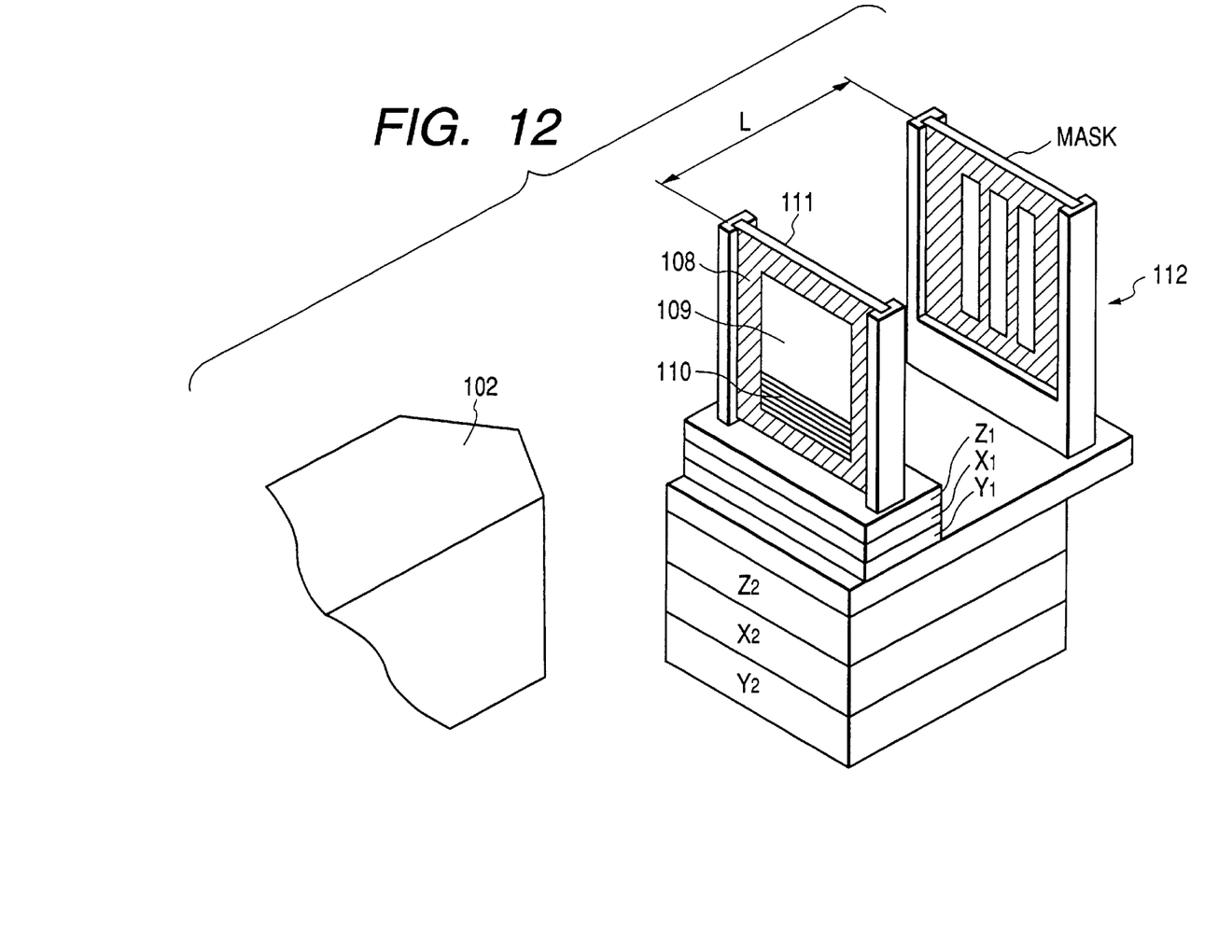
FIG. 12 is a perspective view which shows the structure of the laser mask with which to perform the groove processing in accordance with the conventional example.

Also, when the interior of each nozzle is processed three-dimensionally, the processing depth is made shallower by reducing the laser beam 102 which is incident upon the work (see FIG. 12). Therefore, the carbon created from the 128 nozzles processed in the preceding step is removed by the laser beam to process grooves before the grooves of the following 128 nozzles are processed in the next step. However, it is sometimes impossible to remove the carbon sufficiently by the application of the reduced laser beam used for processing the shallower portion. Particularly, the shallower the processing depth, the weaker becomes the force to remove carbon, because the laser beam is more reduced. As a result, it becomes difficult to perform processing in good precision due to remaining carbon (see FIG. 11).

Here, in FIG. 12, a reference numeral 108 designates the total reflection film; 109, the film having the greater transmittance for deeper processing; 110, the film having the smaller transmittance for shallower processing; 111, the member for forming extrusions; and 112, the mask.

Also, with the structure disclosed in the specification of Japanese Patent Application Laid-Open No. 10-118782, the amount of actually reduced beam tends to fluctuate depending on the finish of the light shielding pattern of the mask, which leads to the resultant variation of accuracy after processing. Usually, this variation does not exert serious influence, but it should become no longer negligible when processing the ink jet head used for the formation of more precise images in higher quality as described earlier.

Also, when the nozzle grooves are processed by the application of the laser beam, the walls remaining on the side faces of the grooves thus produced are inclined. This inclination becomes greater or smaller depending on the intensities of the energy of the laser beam (see FIG. 13). For the portion where the processing depth is shallower, that is, the energy of laser beam is made smaller due to the reduction of the amount thereof, this inclination becomes greater, and the lower face of each wall is in the form which is largely deviated to the inner side. In other words, the deep portion of each groove becomes extremely smaller. This means that when orifices are processed after the grooves are formed, the laser beam for use of drilling is blocked by the wall portions of the grooves. Then, the resultant hole configuration is subjected to irregularity, and it may become impossible to obtain the size of orifices as anticipated. As a result, the ink jet recording head thus manufactured is not suitable eventually for recording images in higher quality as desired.

SUMMARY OF THE INVENTION

The present invention is designed in consideration of these problems discussed above. It is an object of the invention to provide a laser processing method whereby to incorporate an elongated and highly precise nozzles in higher density, which is most suitable for the higher speed recording in higher image quality demanded for an ink jet recording head. It is another object of the invention to provide an ink jet recording head manufactured by such method as this.

With the provision of the following means, it is possible to attain the objectives of the invention.

In other words, the method of the present invention for manufacturing an ink jet recording head, which is provided with a ceiling plate having grooves of locally different depth to form ink paths arranged corresponding to each of plural discharge ports; and a substrate having discharge energy generating elements each arranged on a part of each of the paths, and which is structured by bonding the ceiling plate and the substrate together, comprises the steps of performing a first laser processing to process grooves of first depth by irradiating laser beam through a first mask pattern corresponding to the ink path pattern of the ceiling plate; and performing a second laser processing to form a region of locally different depth in each of the grooves by irradiating laser beam through a second mask pattern having the reduced beam pattern to be locally open on the exposure region of the first mask pattern corresponding to the grooves each having the first depth.

Also, for this method, no beam reduction pattern for reducing the laser beam is included in the first pattern.

Also, the positioning of the second mask pattern with the grooves is made to be in agreement with the inclined portions processed and formed on the walls of the grooves.

Also, the first and the second laser processing steps are performed in plural times, respectively, by deviating the positional relationship between the ceiling plate and mask in the arrangement direction of grooves so as to make the grooves adjacent to the plural grooves that have been processed.

Also, the first mask pattern and the second mask pattern are provided for one and the same mask, and the positioning of the second mask pattern with the grooves is performed by moving the mask in the direction along the ink paths.

In order to achieve the objectives of the invention, an ink jet head which is manufactured by the method described above is also provided.

With the method as referred to in the preceding paragraphs, the processing is performed up to the first depth without reducing beam. Then, it is made possible to execute processing steps in good precision without being affected by the carbon produced in the process of the adjacent nozzles.

Also, for the portions where the processing depth should change, the masks are changed to process configurations freely as desired. At the same time, by the utilization of the inclinations formed on the wall faces of the first grooves which have been processed last, the positioning is made to obtain the grooves processed in higher precision.

Also, it is possible to execute processing without being affected much by the variation of finished dimensions irrespective of the mask pattern having the reduced beam.

Also, it is arranged to process inclinations so as not to allow them to be made greater. Therefore, the orifices which should be drilled subsequently present highly precise configuration, because the beam is not blocked by the walls of the grooves, hence making it possible to provide a method for processing an elongated ink jet head for use of the formation of images in higher quality.

DETAILED DESCRIPTION OF THE PREFERRED EMBODIMENTS

Hereinafter, the present invention will be described specifically in accordance with the embodiments thereof.
(First Embodiment)

Figure 1A:
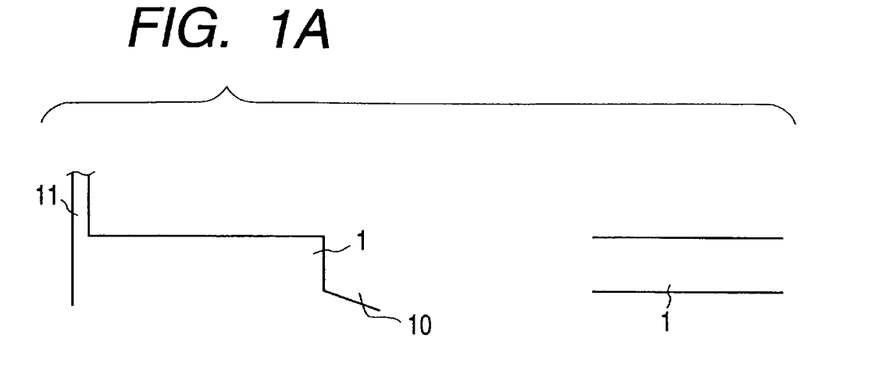
FIGS. 1A, 1B and 1C are views which illustrate the processing steps in accordance with the present invention.
Figure 1B:
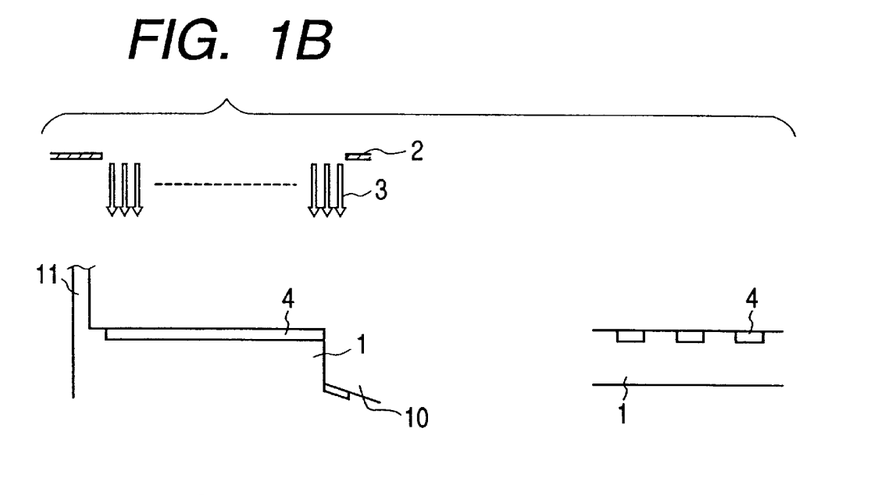
Figure 1C:
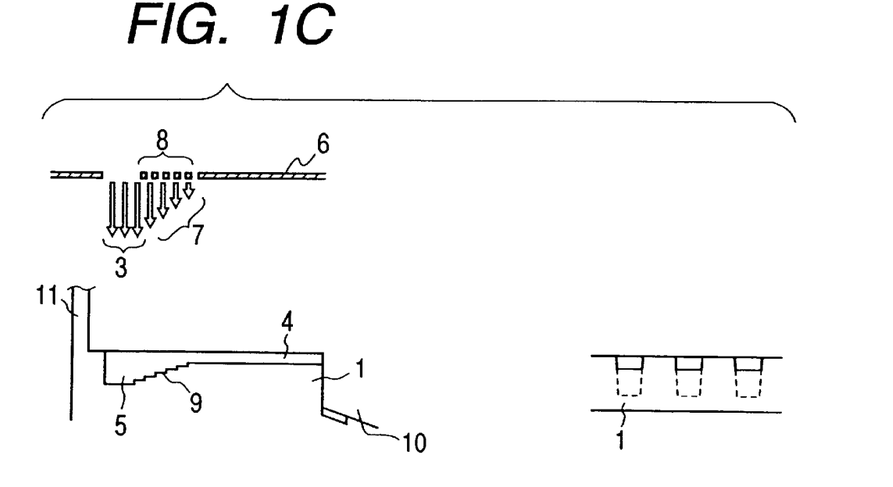

FIGS. 1A to 1C are views which illustrate the features of the present invention.

In FIG. 1A, a reference numeral 1 designates the section of the portion where the nozzles are process for an ink jet head, which is called the ceiling plate. This view shows the state where no nozzles have been processed as yet.

In FIG. 1B, the laser beam 3 is formed in a desired pattern by use of the mask 2, which arrives at the ceiling plate, hence processing each of the grooves 4 to the depth on the shallower side. At this juncture, the laser beam irradiated onto the ceiling plate is irradiated fundamentally in such a manner that it is not attenuated greatly by the presence of the mask.

Then, the mask patterns are replaced, and the pattern at 6 is adjusted to the processing portion of the ceiling plate 1. In order to change the processing depths, this pattern is formed by a pattern that allows the laser beam to transmit, together with a beam reduction pattern which is incorporated in it. In other words, the beam reduction pattern is not arranged on the portion which needs a deeper processing so as not to be affected by any attenuation, while the beam reduction pattern is arranged more closely on the portion which needs a shallower processing so that the attenuation is made greater. Then, between these two portions, the densities of the beam reduction pattern is made gradually variable so that the degree of attenuation is gradually changed from the larger to the smaller. There is of course no need for the arrangement of such gradual changes depending on the desired configurations. It can be changed abruptly without any problem as the case may be. In this respect, a reference numeral 3 designates the laser beam transmitted through the mask without any attenuation, and 7, the laser beam transmitted through the mask with the gradual attenuation by means of the beam reduction pattern 8. In this way, it becomes possible to form the portion 5 which is deeply processed and the portion 9 the depth of which is gradually changed.

On the right-hand side of FIGS. 1A to 1C, the groove processing portion is represented as observed from the common liquid chamber 10 side correspondingly.

Also, a reference numeral 11 designates the portion which becomes the orifice plate. Orifices are processed on it by the application of laser processing or the like.

Figure 2:
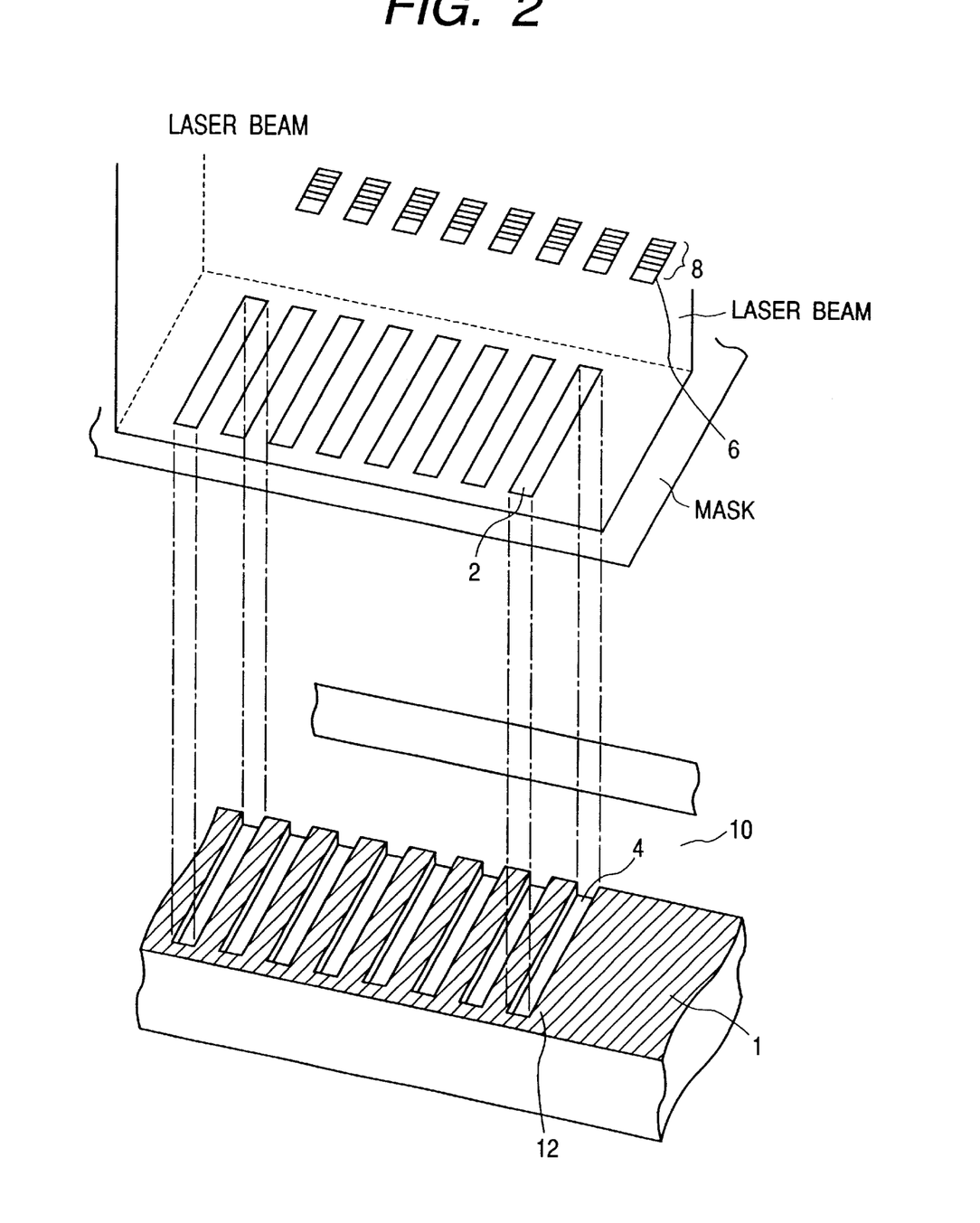
FIG. 2 is a perspective view which shows a first processing step in accordance with the present invention.

FIG. 2 is a perspective view showing the state where processing is performed to the depth on the shallower side as illustrated in FIG. 1B. Here, in order to make the illustrate readily understandable, the orifice plate 11 is omitted. As clear from FIG. 2, it is desirable to form the mask pattern 2 for use of the shallower processing portion, as well as the portion 6 where the beam reduction pattern 8 is incorporated to change the depths on one and the same pattern. Here, it is desirable to form the beam reduction pattern by selectively arranging the shielding unit which is smaller than the quotient of the resolution in the projection optical system where the image of the mask pattern is focused on the processing surface by a given magnification divided by the aforesaid magnification. However, it is of course possible to obtain the same effect by coating the beam reduction film or the like.

Figure 3:
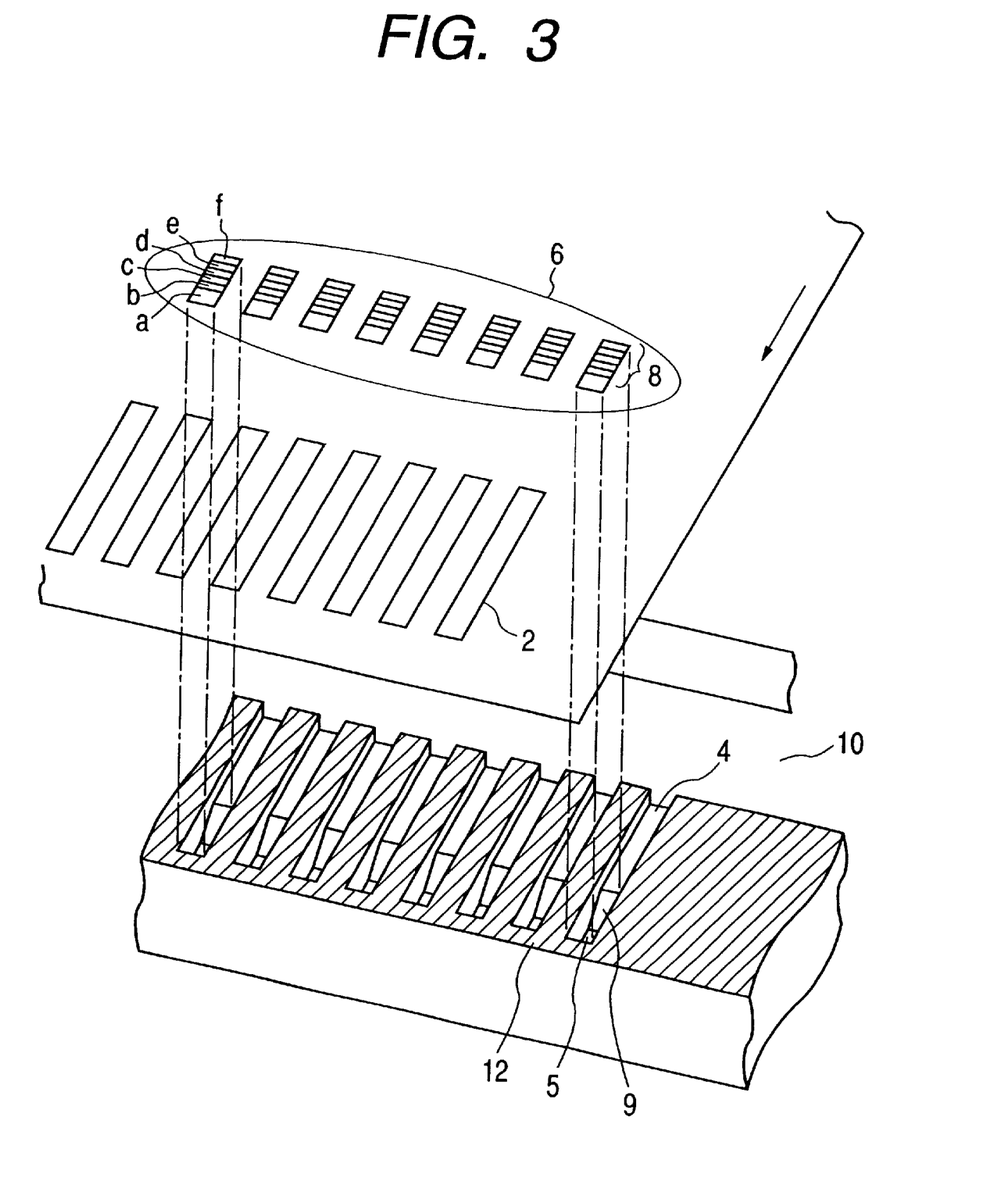
FIG. 3 is a perspective view which shows a second processing step in accordance with the present invention.

FIG. 3 is a view which shows the state of the deep processing portion 5 and the portion 9 whose processing depth gradually changes. In this respect, it is possible to adjust the mask with the portion 5 and the portion 9 by moving it in the direction indicated by an arrow accordingly.

In FIG. 2 and FIG. 3, the hatched portion, which is designated by a numeral 12 on the processing surface, indicates the carbon from the ceiling plate 1 when the grooves 4, 5, and 9 are processed, which is accumulated near each of the laser processed portions. In this respect, polysulfone is used for the present invention, because it is easily processed by the application of excimer laser, and also, it has the excellent stability to ink used for ink jetting. However, the present invention is not necessarily limited to the use of polysulfone. It is of course possible to adopt the liquid crystal polymer (total aromatic polyester) or any other resin that may be processed by the application of laser.

Now, reverting to the processing method, this accumulated carton may present problems in some cases as described earlier with respect to the conventional example where a wider region should be processed than the one that can be processed by the application of laser at a time, such as processing an elongated head. In such a case, processing is divided into several portions, but the carbon becomes a problem on the portion that should be processed later particularly when an elongated head should be processed by the application of laser which is partially attenuated. In the worst case, the resultant processing becomes incomplete.

Figure 4:
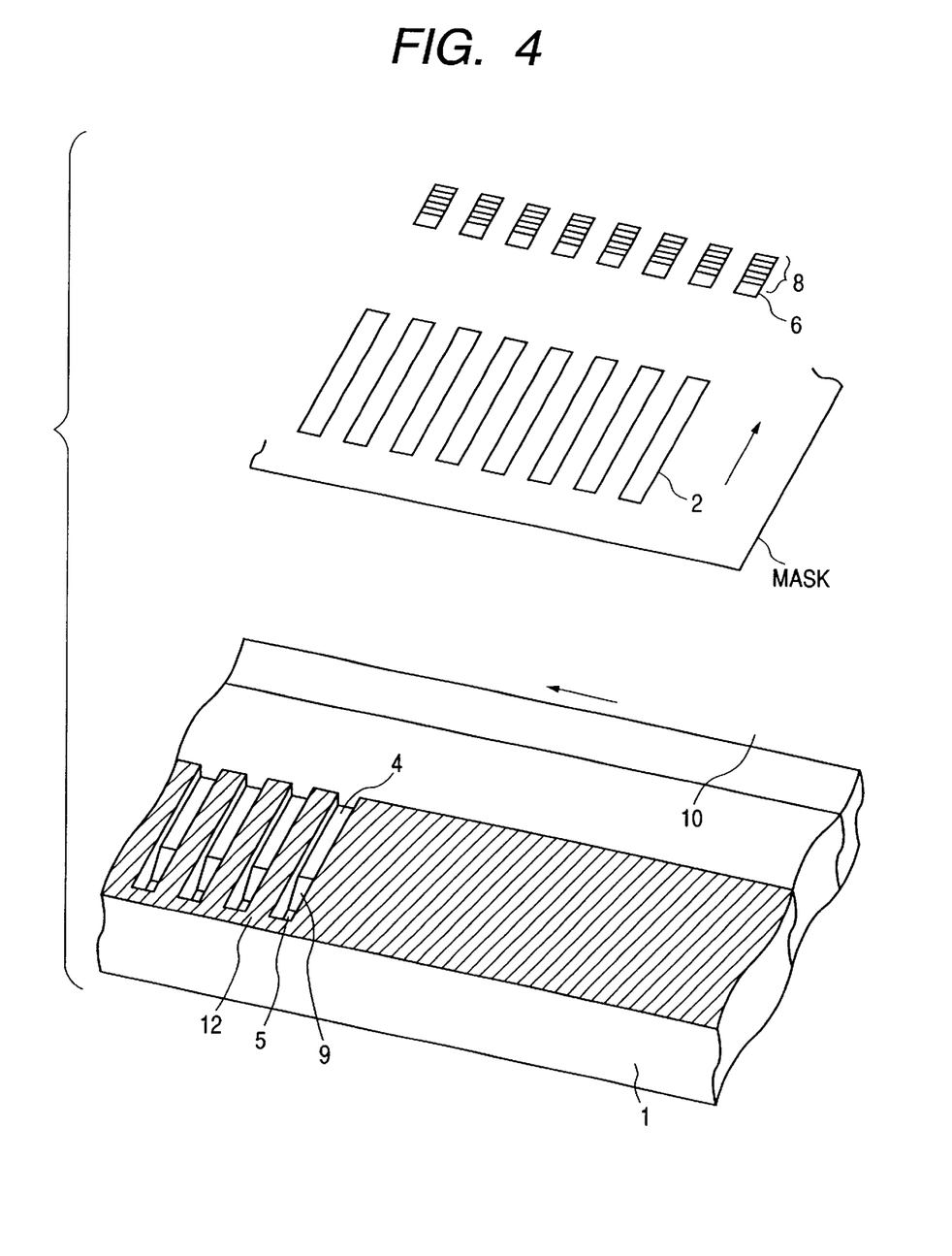
FIG. 4 is a perspective which shows the state where elongated grooves are continuously processed in accordance with the present invention.
Figure 5:
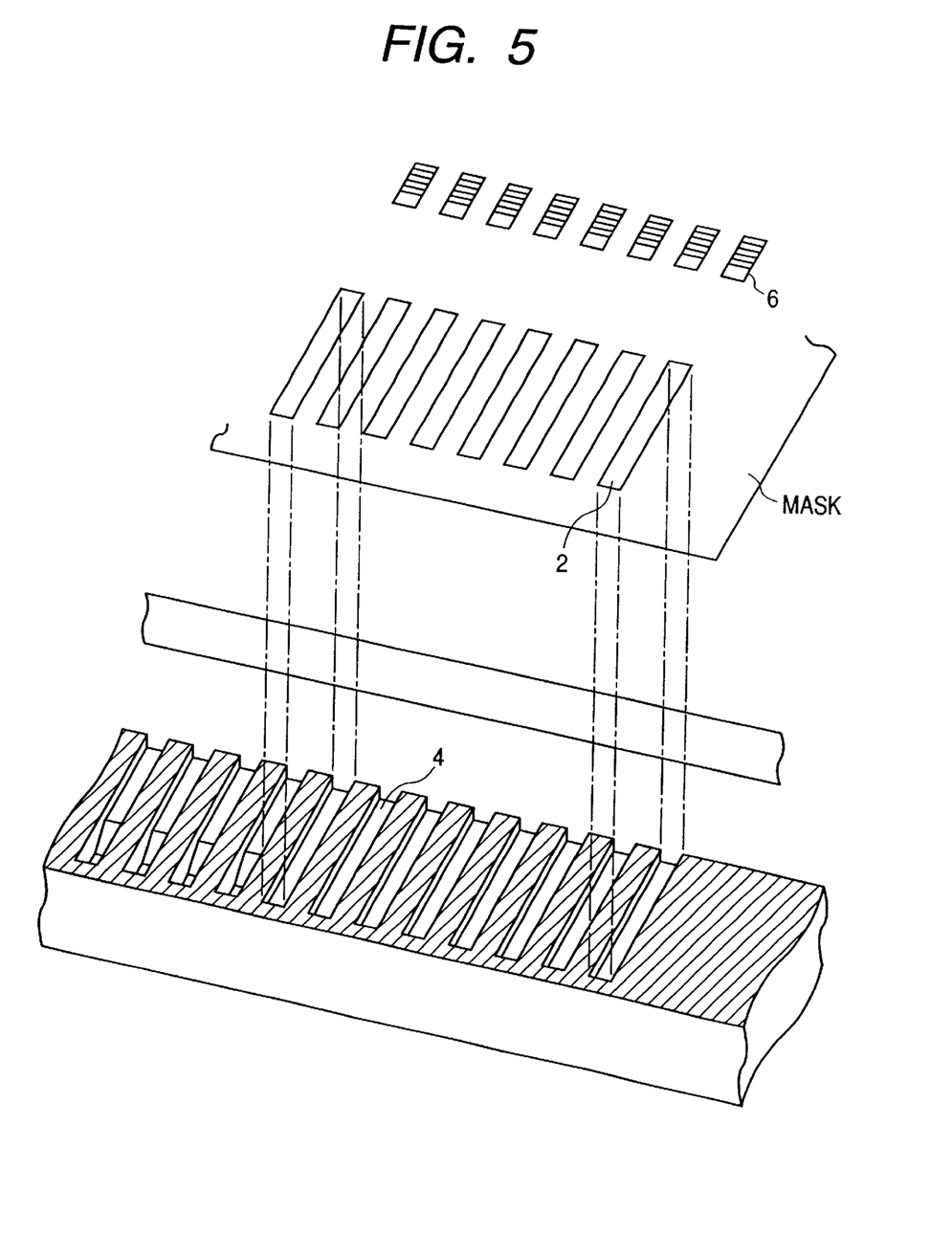
FIG. 5 is a perspective view which shows the state where elongated grooves are continuously processed in accordance with the present invention.

In contrast, in accordance with the present invention, when the adjacent portion should be processed later, the mask is moved in the direction indicated by an arrow in FIG. 4 to the same position as shown in FIG. 2, and also, the ceiling plate 1 is moved in the direction indicated by an arrow so that as shown in FIG. 5, a desired pattern is irradiated onto the ceiling plate by the laser beam which is not attenuated by use of the pattern 2 without any beam reduction at all. Therefore, the accumulated carbon is removed assuredly by the intensified laser beam, hence making it possible to process the shallower grooves 4 in good precision.

The processing steps thereafter are completed by repeating those which have been described up to now.

With the processing thus executed, it becomes possible to process elongated grooves in higher precision, and to provide an elongated ink jet head which is capable of producing images in higher quality.

Figure 6:
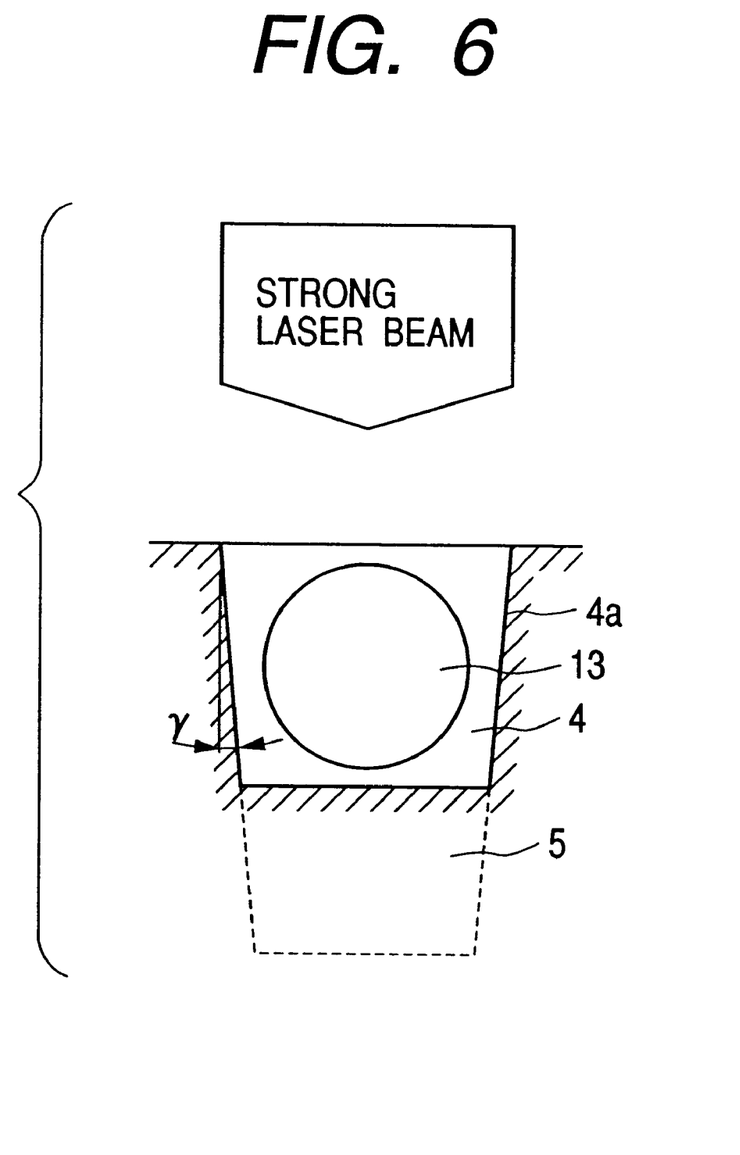
FIG. 6 is a cross-sectional view which shows the groove processed by the processing method of the present invention.

FIG. 6 is a view which shows the grooves 4 and 5 processed in accordance with the present invention, observed from the common liquid chamber 10 side. The deeply processed portion 5 is indicated by broken line. Here, a reference numeral 13 designates the orifice which appears in the processing step after the completion of groove processing. As obvious from FIG. 6, it is possible to form the orifice 13 in a clear configuration without any intervention with the side walls 4*a* of the groove 4. As compared with the conventional example shown in FIG. 13, it is readily understandable that there is a difference between them definitely.

Figure 13:
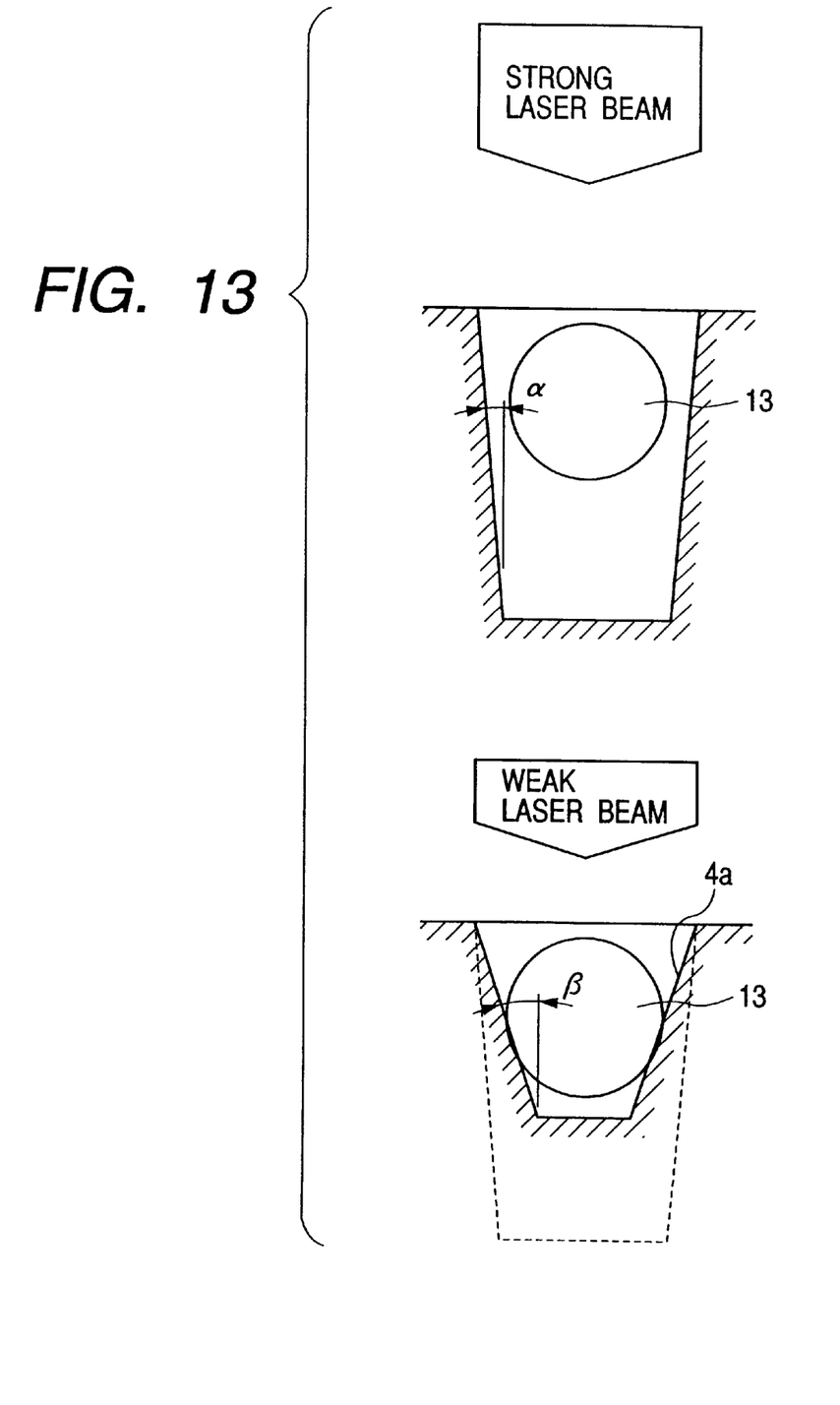
FIG. 13 is a cross-sectional view which shows the difference due to the intensities of the laser beam applied to the groove process in accordance with the conventional example.

In accordance with the conventional example, the inclination β formed on each of the side faces becomes greater, because the groove is processed by the attenuated laser beam. Consequently, as compared with the dimension on the incident side, which is determined by the dimension of the mask, the width of the groove on the bottom is greatly deviated toward the inner side. As a result, the laser beam irradiated for processing the orifice is shielded by the presence of the wall faces.

On the other hand, in accordance with the processing method of the present invention, the laser beam is not attenuated to process the groove 4 on the shallower side. Therefore, the inclination γ becomes smaller, and the laser beam for processing the orifice is not shielded at all, hence processing the orifice in a clear configuration in good precision.

For the relationship between the mask patterns 2 and 6, it is easier to position them if the pattern 6 which is processed later is made the same as or slightly smaller than the pattern 2 which is processed earlier. Particularly, it is desirable to make the pattern 6 sightly smaller to position the mask by the utilization of the inclination thus formed. Then, the inclined faces are prevented from being processed, because the laser beam that hits them is reflected, and the processing joints are made smoother and clearer.

Figure 10:
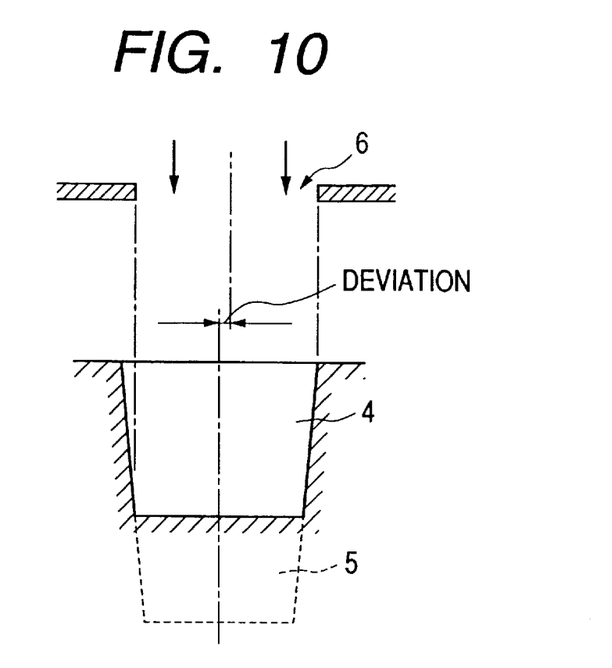
FIG. 10 is a cross-sectional view which shows the relationship between the mask and the groove in accordance with the first embodiment of the present invention.

Also, the inclined faces absorb slight deviations that may take place in positioning. Therefore, the accuracy of each processed groove is excellent, not to mention the case with which to process each of them (see FIG. 10).

(Second Embodiment)

In conjunction with FIG. 7, another embodiment will be described in accordance with the present invention.

Figure 7:
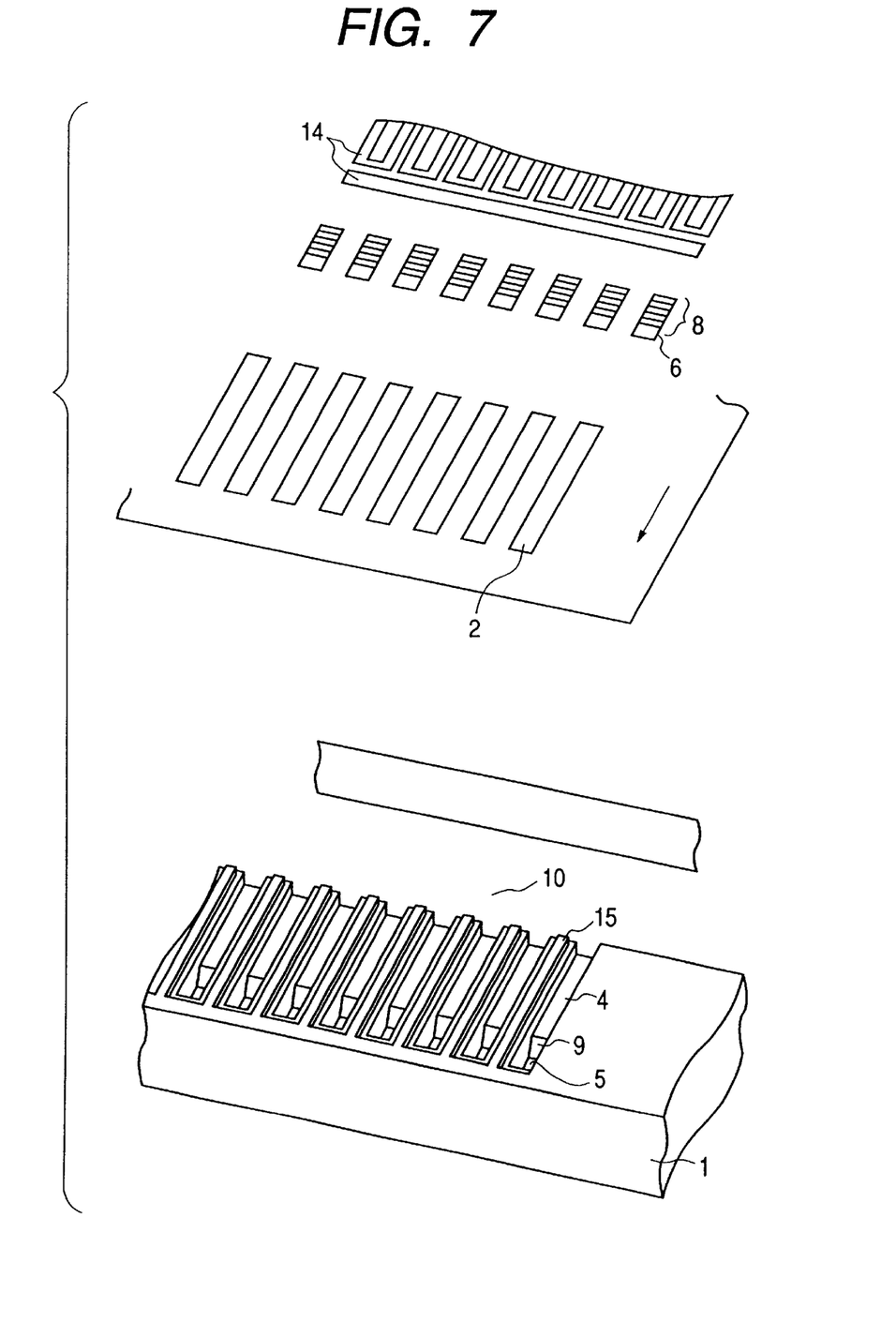
FIG. 7 is a perspective view which shows another embodiment in accordance with the present invention

In FIG. 7, the ceiling plate 1 is arranged to be a type in which the squeezes 15 are provided for the bonding surfaces to make the connection more reliable with the counterpart member, in addition to the groove configuration described in conjunction with the first embodiment. Before the formation of the squeezes 15, the processing steps are the same as those described as to the first embodiment. Therefore, the description thereof will be omitted here. It is desirable to form the mask pattern 14 to form the squeezes 15 on the same mask of the pattern 2 or 6. This mask is moved in the direction indicated by an arrow to the ceiling plate 1 having the completely processed grooves 4, 5, and 9 on it. Then, as in processing the pattern 6, the pattern 14 is adjusted to be in agreement with the grooves previously processed. After that, the laser processing is performed.

Now, in conjunction with FIGS. 8A and 8B, which are cross-sectional views showing the groove 4, the description will be made of the processing steps further in detail.

Figure 8A:
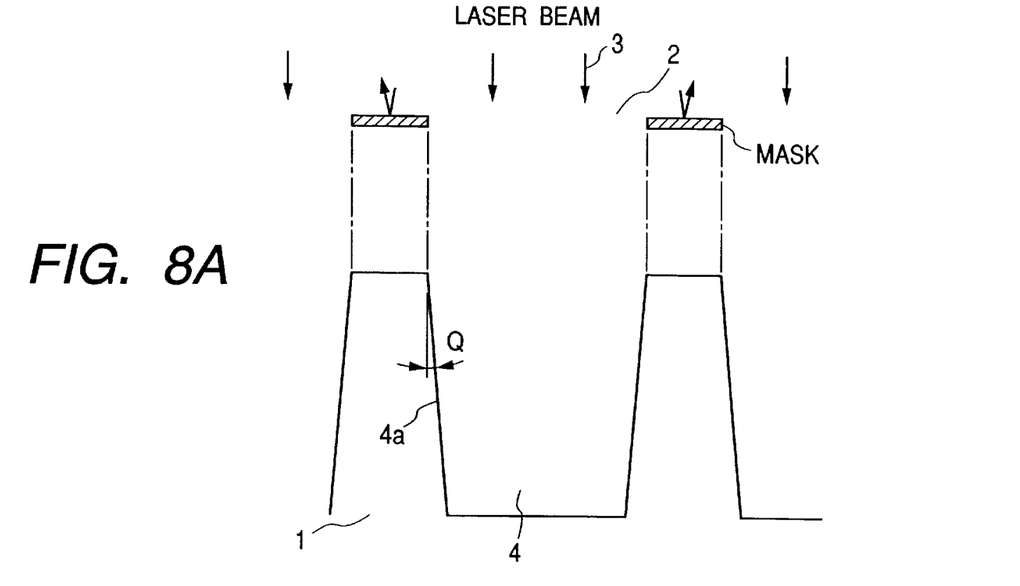
FIGS. 8A and 8B are cross-sectional views which illustrate another embodiment in accordance with the present invention.

FIG. 8A schematically shows the state where the groove 4 is processed by use of the mask having the pattern 2. Here, the groove 4 is processed in the desired configuration by the application of the laser beam which reaches the ceiling plate 1 through the pattern 2 of the mask without being reflected by the mask. In this respect, a reference mark Q designates the inclination processed to make the width of the groove 4 smaller as it approaches the bottom thereof.

Figure 8B:
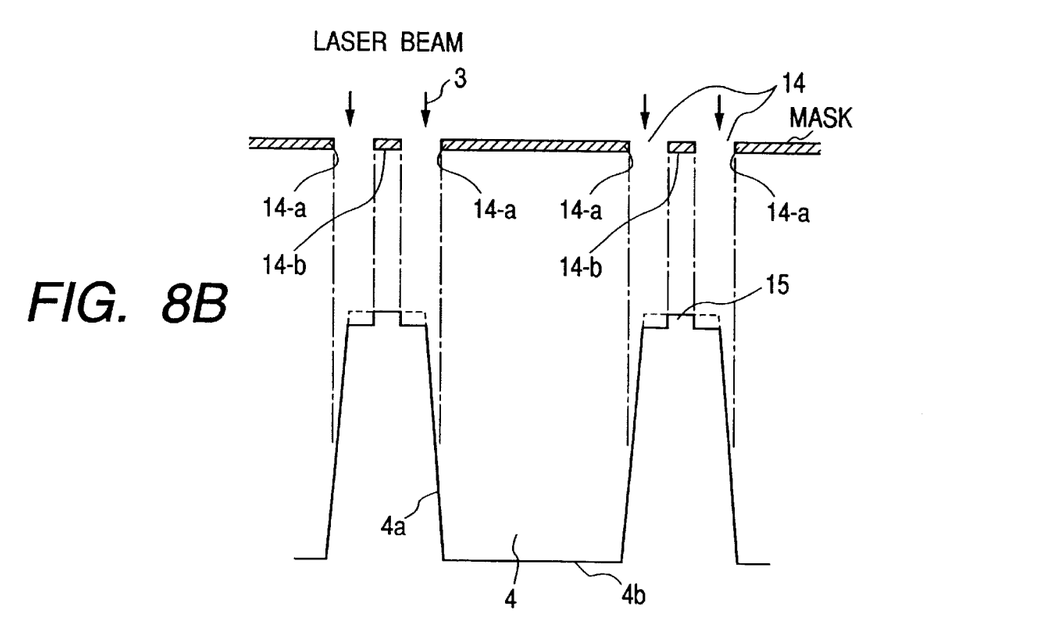

FIG. 8B shows the state where the squeezes 15 are processed. The squeezes 15 are formed by being left intact without any process. The laser beam is reflected by each reflective portion 14-*b* on the pattern 14 of the mask so as not to allow the laser beam to reach the ceiling plate 1.

Here, each edge of the laser beam transmitting portions of the mask pattern 14, that is, each mask 14-*a,* is in the state to overlap each of the inclined faces formed with the side walls 4*a* of each groove 4 which is processed earlier. The laser beam hits on each inclined face is reflected to make its processing power weaker still when processing the inclined face. This condition is utilized to obtain a better finish of the processing. For reference, the condition where the mask 14-*a* is not overlapped up to each of the inclined faces 4*a* is represented in FIGS. 9A and 9B.

Figure 9A:
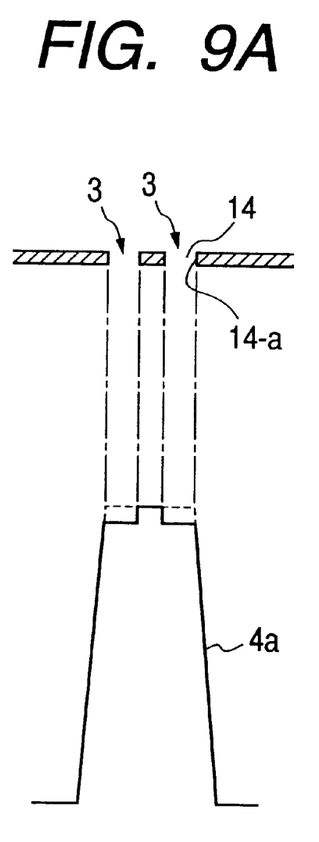
FIGS. 9A and 9B are cross-sectional views which illustrate the positional relationship between the mask and the groove in accordance with another embodiment of the present invention.
Figure 9B:
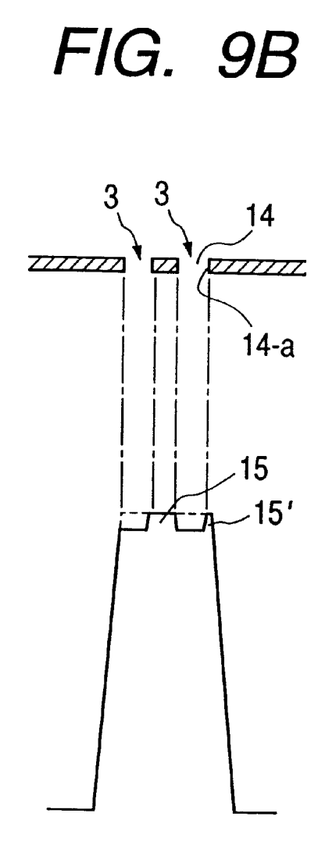

As clear from FIGS. 9A and 9B, if the positioning of the mask is performed exactly, there is no problem at all as shown in FIG. 9A. However, as shown in FIG. 9B, if there is a deviation between the mask and the ceiling plate, there appears a portion 15' which is not processed at all besides the squeeze 15. This unprocessed portion may impede a stable contact with the counterpart member (not shown) in some cases.

With respect to the first and second embodiments, the relationship between the mask and the processing surface of the ceiling plate is described and indicated by a ratio of one to one in the related figures. In this respect, it is to be understood that this one to one arrangement in the representation is made just to simplify the description. The beam may be converged from the mask to the work (here, the ceiling plate) for the actual execution of more precise processes. It is, of course, possible for the present invention to demonstrate the effect most desirably also in such a case.

What is claimed is:

1. A method for manufacturing an ink jet recording head including a ceiling plate having grooves that form ink paths arranged corresponding to each of plural discharge ports, and a substrate having discharge energy generating elements each arranged on a part of each of the ink paths, and structured by bonding the ceiling plate and the substrate, comprising the following steps of:

providing a first mask pattern having a plurality of openings without laser energy reduction patterns, each opening corresponding to an ink path;

performing a first laser processing to form grooves of a first depth by irradiating laser energy through the first mask pattern, each of the grooves corresponding to an ink path;

providing a second mask pattern having a plurality of openings, each opening corresponding to an ink path and having a laser energy reduction pattern;

performing a second laser processing to form a region of a second depth, deeper than the first depth, in each of the grooves by irradiating laser energy through the second mask pattern changing the relative position of the ceiling plate and the first mask pattern in a direction perpendicular to axes of the ink paths;

repeating said first laser processing step to form additional grooves adjacent to grooves already formed in said first laser processing step;

providing a third mask pattern having a plurality of openings, each opening corresponding to an ink path and having a laser energy reduction pattern; and performing a third laser processing to form squeeze portions between the grooves by irradiating laser energy through the third mask pattern, each squeeze portion having a central portion and edge portions formed on both sides of the central portion, the edge portions having depths less than the first depths of the grooves.

2. A method for manufacturing an ink jet head according to claim 1, wherein the openings of the second mask pattern are smaller than the openings of the first mask pattern so as to be in alignment with inclined portions formed on the walls of the grooves formed in said first laser processing step.

3. A method for manufacturing an ink jet head according to claim 1, further comprising the steps of:

changing the relative position of the ceiling plate and the second mask pattern in a direction perpendicular to axes of the ink paths; and repeating said second laser processing step on additional grooves adjacent to the grooves processed in said second laser processing step.

4. A method for manufacturing an ink jet recording head according to claim 1, wherein the first mask pattern and the second mask pattern are formed on a single mask structure, and the second mask pattern is positioned in said second laser processing step by moving the single mask structure in a direction along the axes of the ink paths.

5. A method for manufacturing an ink jet recording head according to claim 1, wherein the first mask pattern, the second mask pattern, and the third mask pattern are formed on a single mask structure, and the third mask pattern is positioned in said third laser processing step by moving the single mask structure in a direction along the axes of the ink paths.

* * * * *

UNITED STATES PATENT AND TRADEMARK OFFICE
CERTIFICATE OF CORRECTION

PATENT NO.    : 6,387,601 B1
DATED         : May 14, 2002
INVENTOR(S)   : Tsutomu Abe It is certified that error appears in the above-identified patent and that said Letters Patent is hereby corrected as shown below:

Column 1,
Line 53, "father" should read -- farther --.

Column 4,
Line 64, "illustrate" should read -- illustration --; and
Line 66, "clear" should read -- is clear --.

Column 5,
Line 29, "carton" should read -- carbon --.

Column 7,
Line 7, "clear" should read -- is clear --; and
Line 46, "pattern" should read -- pattern; --.

Signed and Sealed this

Third Day of December, 2002

JAMES E. ROGAN
*Director of the United States Patent and Trademark Office*